US008343613B2

(12) United States Patent
Poloso et al.

(10) Patent No.: US 8,343,613 B2

(45) Date of Patent: Jan. 1, 2013

(54) ANTI-SKID SHEET FOR THERMOFORMED ARTICLES

(75) Inventors: Anthony Poloso, Prairieville, LA (US); Ernest R. Anderson, Garrettsville, OH (US); Felix Manuel Zacarias, Akron, OH (US); M. Glenn Williams, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 795 days.

(21) Appl. No.: 12/029,530

(22) Filed: Feb. 12, 2008

(65) Prior Publication Data

US 2009/0202803 A1 Aug. 13, 2009

(51) Int. Cl.

| | |
|---|---|
| ***B32B 1/00*** | (2006.01) |
| ***B32B 3/00*** | (2006.01) |
| ***B32B 7/02*** | (2006.01) |
| ***B32B 27/08*** | (2006.01) |
| ***B29C 47/06*** | (2006.01) |

(52) U.S. Cl. ........ 428/178; 420/188; 420/213; 420/215; 420/332; 420/337; 428/516; 428/517; 264/241

(58) Field of Classification Search ........................ None
See application file for complete search history.

(56) References Cited

U.S. PATENT DOCUMENTS

| | | | | |
|---|---|---|---|---|
| 4,428,306 | A | 1/1984 | Dresen et al. | |
| 4,735,154 | A | 4/1988 | Hemery | |
| 6,146,739 | A | 11/2000 | Itoh et al. | |
| 6,726,969 | B1 * | 4/2004 | Balaji et al. | 428/35.7 |
| 7,316,847 | B2 * | 1/2008 | MacNeil | 428/515 |
| 2003/0041956 | A1 | 3/2003 | Pigott et al. | |
| 2006/0091694 | A1 * | 5/2006 | MacNeil | 296/97.23 |
| 2006/0222861 | A1 * | 10/2006 | Jacob et al. | 428/422 |
| 2007/0194482 | A1 * | 8/2007 | Douglas et al. | 264/173.11 |

FOREIGN PATENT DOCUMENTS

JP 62207744 A * 9/1987

* cited by examiner

*Primary Examiner* — Monique Jackson

(74) *Attorney, Agent, or Firm* — Frank E. Reid; Robert L. Abdon; Kevin M. Faulkner

(57) ABSTRACT

Disclosed in one aspect is an anti-skid sheet comprising at least one contact layer selected from the group consisting of dynamically vulcanized alloys, propylene-α-olefin copolymers, and blends thereof; and at least one substrate layer comprising polyethylene having a density of from greater than 0.935 $g/cm^3$. In one embodiment, the dynamically vulcanized alloy comprises a blend of one or more polyolefins and an at least partially vulcanized rubber. Disclosed in another aspect is a method of forming the anti-skid sheet comprising providing a melt-blending extruder for each of the sheet layers, at least one substrate layer as disclosed herein and at least one contact layer as disclosed herein, and co-extruding a melt of each component to form a co-extruded sheet. In a particular embodiment, the anti-skid sheet is thermoformed to form an article.

10 Claims, No Drawings

ANTI-SKID SHEET FOR THERMOFORMED ARTICLES

FIELD OF THE INVENTION

The present invention relates in general to high coefficient of friction surfaces (anti-skid surfaces) that can be co-extruded or otherwise coated upon a harder substrate material for use in forming articles; and in particular to anti-skid pallets having at least one layer in contact with the ground surface or goods placed on the pallet (contact surface) made from a dynamic vulcanizate and/or an elastomeric propylene-α-olefin copolymer.

BACKGROUND OF THE INVENTION

Articles such as boxes, containers and pallets that sit on the ground and/or hold goods should desirably be rigid and impact resistant. Thus, such articles made from plastics benefit by being formed from impact resistant polyolefins such as high density polyethylene, which is not only impact resistant, but can be rigid and inexpensive. However, it is also desirable that such articles not be slippery or become slippery such as when in contact with the wet ground, truck bed or interior, and holding slippery goods. In this regard, high density polyethylene can have the drawback of being slippery as it tends to have a low coefficient of friction.

Most non-skid articles such as pallets are made by physically attaching rubber-type pads to the surface or surfaces, or spraying a rubber-type compound on the article in a secondary operation. Such application of rubbers can impart a high coefficient of friction surface to the article. However, attaching the rubber by physical attachment or spraying involves secondary operations which increase the cost of articles such as pallets, which should be relatively inexpensive.

The present inventors have solved this and other problems by having a hard substrate material such as high density polyethylene compositions co-extruded with at least one high friction contact layer, thus forming an anti-skid sheet. Given that most rubbers would be difficult to co-extrude and form in secondary operations such as thermoforming, the inventors have further found that the use of a processable thermoplastic vulcanizate (or dynamically vulcanized alloy) such as Santoprene™ can be ideal for co-extrusion and subsequent thermoforming processes.

SUMMARY OF THE INVENTION

Disclosed in one aspect is an anti-skid sheet comprising at least one contact layer selected from the group consisting of dynamically vulcanized alloys, propylene-α-olefin copolymers, and blends thereof, and at least one substrate layer comprising polyethylene having a density of from greater than 0.935 g/cm$^3$. In one embodiment, the dynamically vulcanized alloy comprises a blend of one or more polyolefins and an at least partially vulcanized rubber.

Disclosed in another aspect is a method of forming the anti-skid sheet comprising providing a melt-blending extruder for each of the sheet layers, at least one substrate layer as disclosed herein and at least one contact layer as disclosed herein, and co-extruding a melt of each component to form a co-extruded sheet. In a particular embodiment, the anti-skid sheet is thermoformed to form an article.

As will be understood, the various features of these and other aspects of the invention can be combined with the various embodiments of the invention as described herein.

DETAILED DESCRIPTION OF THE INVENTION

Aspects of the present invention include an anti-skid sheet comprising at least one contact layer selected from the group consisting of dynamically vulcanized alloys ("DVA"), propylene-α-olefin copolymers, and blends thereof, and at least one substrate layer comprising polyethylene having a density of from greater than 0.935 g/cm$^3$, otherwise referred to as a "high density polyethylene." The sheet is used in forming, thermoforming in a particular embodiment, articles such as boxes, containers, and pallets that require at least one face to have a relatively high coefficient of friction, or be "anti-skid". This anti-skid face, or one or more layers in one embodiment, is called the contact layer. Sheets of the present invention can include one contact layer, or two contact layers with any number of other contact and/or substrate layers there between.

As used herein, the term "layer" refers to each of the one or more compositions, the same or different, that are secured to one another in thin sheet or sheet-form by any appropriate means such as by an inherent tendency of the materials to adhere to one another, or by inducing the compositions to adhere as by a heating, radiative, chemical, or some other appropriate process. The term "layer" is not limited to detectable, discrete compositions contacting one another such that a distinct boundary exists between the compositions. Preferably however, the composition used to make one layer of a sheet will be different (i.e., the weight percent of components, the properties of each component, and/or the identity of the components may differ) from the composition used to make an adjacent layer, when present on one or both sides. The term "layer" includes a finished product having a continuum of compositions throughout its thickness. The "sheets" of the present invention comprise one or more layers, and may comprise two, three, four or more "layers."

The layers may take on any structure to form a sheet. If the contact layer is "C", and the substrate layer is "S", non-limiting examples of the sheet structures includes CS, CSC, CSSC, CSCSC, CCSSCC, CSCSCSC, CCSCC, CSSSC, CSS, CSSS, CCSS, and other combinations, wherein each "S" and each "C" for a given sheet may be the same or different in their compositional makeup. The sheet can be any desirable thickness, in one embodiment the thickness is within the range of 1 to 10 mm, and from 2 to 8 mm in another embodiment, and from 2.5 to 6 mm in yet another embodiment.

The one or more "contact layer(s)" of the anti-skid sheets are preferably outer layers (exposed to the elements), or layers that contact either the ground surface, and/or materials loaded on top of the article made from the sheet. The contact layer is preferably soft, impact resistant, and possessing a relatively high coefficient of friction. In one aspect of the invention, the contact layer comprises at least 70 wt %, or at least 80 wt %, or at least 90 wt %, or is 100 wt % DVA. In another embodiment, the contact layer comprises at least 20 wt %, or at least 40 wt %, or at least 70 wt %, or at least 80 wt %, or at least 90 wt %, or at least 100 wt % of the propylene-α-olefin copolymer, by weight of the contact layer composition, or the propylene-α-olefin copolymer may comprise from 10 to 40 wt % in yet another embodiment, and comprise from 5 to 30 wt % in yet another embodiment by weight of the contact layer composition. In another embodiment, the propylene-α-olefin copolymer is not present and each contact layer consists essentially of DVA.

A DVA comprises one or more theromoplastics and one or more curable polymers, at least one curable polymer of which is at least partially cured. In aspects of the present invention, the thermoplastic and curable polymer are dynamically vulcanized. As used herein, the term "dynamic vulcanization" means vulcanization or curing of at least one curable polymer, curable rubber in a particular embodiment, blended with at least one thermoplastic under conditions of shear and/or temperatures sufficient to plasticize the mixture. A "fully vulcanized" (or fully cured or fully crosslinked) rubber can be characterized in one embodiment by a given percentage range of the crosslinkable rubber that is extractable in boiling xylene or cyclohexane, for example, 5 wt % or less, or 4 wt % or less, or 3 wt % or less, or 2 wt % or less, or 1 wt % or less. A polymer composition is partially cured when the extractables are greater than 5 wt %, and between 5 and 20 wt % in a particular embodiment. The percentage of extractable rubber can be determined by the technique set forth in U.S. Pat. No. 4,311,628, and the portions of that patent referring to that technique. The DVA may comprise other additives as described herein.

Dynamically vulcanized alloys typically have the characteristic of elasticity, i.e. they are capable of recovering from large deformations quickly and forcibly. One measure of this rubbery behavior is that the material will retract to less than 1.5 times its original length within one minute, after being stretched at room temperature to twice its original length and held for one minute before release (ASTM D1566). Another measure is found in ASTM D412, for the determination of Tensile Set. The materials are also characterized by high elastic recovery, which refers to the proportion of recovery after deformation and may be quantified as percent recovery after compression. A perfectly elastic material has a recovery of 100% while a perfectly plastic material has no elastic recovery. Yet another measure is found in ASTM D395, for the determination of Compression Set.

In one embodiment, the curable polymer is a rubber. The term "rubber" broadly means any material that is considered by persons skilled in the art to be a "rubber," preferably a crosslinkable rubber (e.g., prior to vulcanization) or crosslinked rubber (e.g., after vulcanization). In addition to natural rubber, specific rubber components include, without limitation, any olefin-containing rubber such as ethylene-propylene copolymers ("EPM"), including particularly saturated compounds that can be vulcanized using free radical generators such as organic peroxides, as noted in U.S. Pat. No. 5,177,147. Other rubber components are ethylene-propylene-diene ("EPDM") rubber, or EPDM-type rubber. An EPDM-type rubber can be a terpolymer derived from the polymerization of at least two different $C_2$-$C_{10}$ monoolefin monomers, preferably $C_2$-$C_4$ monoolefin monomers, and at least one $C_5$-$C_{20}$ poly-unsaturated olefin. Those monoolefins desirably have the formula $CH_2{=}CH(R)$ where R is H or a $C_1$-$C_{12}$ alkyl. The preferred monoolefins are ethylene and propylene. Desirably the repeat units from at least two monoolefins (and preferably from ethylene and propylene) are present in the polymer in weight ratios of 15:85 to 85:15 (ethylene:propylene) and constitute from 90 to 99.6 wt % of the polymer. The polyunsaturated olefin can be a straight chained, branched, cyclic, bridged ring, bicyclic, fused ring bicyclic compound etc., and preferably is a nonconjugated diene. Desirably, repeat units from the nonconjugated polyunsaturated olefin are from 0.4 to 10 wt % of the rubber.

Another type of rubber is butyl rubber. The term "butyl rubber" includes a polymer that predominantly includes repeat units from isobutylene but also includes a few repeat units of a monomer that provides a site for crosslinking. Monomers providing sites for crosslinking include a polyunsaturated monomer such as a conjugated diene or divinyl benzene. Desirably, from 90 to 99.5 wt % of the butyl rubber are repeat units derived from the polymerization of isobutylene, and from 0.5 to 10 wt % of the repeat units are from at least one polyunsaturated monomer having from 4 to 19 carbon atoms. Preferably, the polyunsaturated monomer is isoprene or divinylbenzene. The polymer may be halogenated to further enhance reactivity in crosslinking. Preferably, the halogen is present in amounts from 0.1 to 10 wt %, more preferably 0.5 to 3.0 wt % based upon the weight of the halogenated polymer; preferably the halogen is chlorine or bromine. The brominated copolymer of p-alkylstyrene, having from 9 to 12 carbon atoms, and an isomonoolefin, having from 4 to 7 carbon atoms, desirably has from 88 to 99 wt % isomonoolefin, more desirably from 92 to 98 wt %, and from 1 to 12 wt % p-alkylstyrene, more desirably from 2 to 8 wt % based upon the weight of the copolymer before halogenation. Desirably, the alkylstyrene is p-methylstyrene and the isomonoolefin is isobutylene. Desirably, the percent bromine is from 0.2 to 8, more desirably from 0.2 to 3 wt % based on the weight of the halogenated copolymer. The copolymer is a complementary amount, i.e., from 92 to 99.8, more desirably from 97 to 99.8 wt %. These polymers are commercially available from ExxonMobil Chemical Co. and other sources.

EPDM, butyl and halobutyl rubbers are rubbers low in residual unsaturation and are preferred when the vulcanizate needs good thermal stability or oxidative stability. The rubbers low in residual unsaturation desirably have less than or equal to 10 wt % repeat units having unsaturation. Desirably, excluded are acrylate rubber and epichlorohydrin rubber.

Rubbers can also include natural rubbers or synthetic homo- or copolymers of at least one conjugated diene. Those rubbers are higher in unsaturation than EPDM rubber or butyl rubber. Those rubbers can optionally be partially hydrogenated to increase thermal and oxidative stability. Desirably, those rubbers have at least 50 wt % repeat units from at least one conjugated diene monomer having from 4 to 8 carbon atoms. Comonomers that may be used include vinyl aromatic monomer(s) having from 8 to 12 carbon atoms and acrylonitrile or alkyl-substituted acrylonitrile monomer(s) having from 3 to 8 carbon atoms. Other comonomers desirably include repeat units from monomers having unsaturated carboxylic acids, unsaturated dicarboxylic acids, unsaturated anhydrides of dicarboxylic acids, and include divinylbenzene, alkylacrylates and other monomers having from 3 to 20 carbon atoms.

Rubbers can also be synthetic rubber, which can be nonpolar or polar depending on the comonomers. Examples of synthetic rubbers include synthetic polyisoprene, polybutadiene rubber, styrene-butadiene rubber, butadiene-acrylonitrile rubber, etc. Amine-functionalized, carboxy-functionalized or epoxy-functionalized synthetic rubbers may be used, and examples of these include maleated EPDM, and epoxy-functionalized natural rubbers. These materials are commercially available. Non-polar rubbers are preferred; polar rubbers may be used but may require the use of one or more compatibilizers, as is well known to those skilled in the art.

A list of preferred rubber components includes any rubber selected from the following: ethylene-propylene rubber (EPM), ethylene-propylene-diene rubber (EPDM), natural rubber (polyisoprene), butyl rubber, halobutyl rubber, halogenated rubber copolymer of p-alkystyrene and at least one $C_4$-$C_7$ isomonoolefin, a copolymer of isobutylene and divinyl-benzene, homopolymers of a conjugated diene (preferably a $C_4$-$C_8$ conjugated diene), copolymers of at least one conjugated diene and a comonomer (preferably where the copolymer has at least 50 wt % repeat units from at least one $C_4$-$C_8$ conjugated diene and/or the comonomer is a polar monomer, a $C_8$-$C_{12}$ vinyl aromatic monomer, an acrylonitrile monomer, a $C_3$-$C_8$ alkyl substituted acrylonitrile monomer, an unsaturated carboxylic acid monomer, an unsaturated anhydride of a dicarboxylic acid or a combination thereof), unsaturated non-polar elastomers, polybutadiene elastomer, styrene-butadiene elastomer and mixtures thereof.

The term "thermoplastic" broadly means any polymer that is not a "rubber" (as defined herein) and that is a polymer or polymer blend considered by persons skilled in the art as being thermoplastic in nature, that is, a polymer that softens when exposed to heat and returns to its original condition when cooled to room temperature. The thermoplastics of the present invention may be selected from any of the following: crystallizable polyolefins, polyimides, polyamides, polyesters, poly(phenylene ether), polycarbonates, styrene-acrylonitrile copolymers, polyethylene terephthalate, polybutylene terephthalate, polystyrene, polystyrene derivatives, polyphenylene oxide, polyoxymethylene, fluorine-containing thermoplastics, polyurethanes and mixtures thereof.

In one or more embodiments, the thermoplastic is a polypropylene (isotactic in one embodiment) having a melting point greater than 110° C., or 120° C., or 130° C., or 140° C., or 150° C. In certain embodiments, the thermoplastic may include a polypropylene polymer having a melt flow rate ("MFR", 230° C./2.16 kg, using ASTM 1235 throughout this specification) of 1.0 to 30 dg/min. Alternatively, the thermoplastic component may include a "fractional" polypropylene having a melt flow rate less than 1.0 dg/min. In yet another embodiment, the thermoplastic further includes a first polypropylene having a melting point greater than 110° C. and a melt flow rate ranging from 1.0 to 30 dg/min and a second polypropylene having a melting point greater than 110° C. and a melt flow rate of less than 1.0 g/min.

Preferably, the polypropylene of the DVA described herein that has a melting point above 110° C. and includes at least 90 wt % propylene units and is a polypropylene homopolymer, or copolymer comprising from 0.1 to 5 wt % $C_2$ or $C_6$ to $C_{10}$ α-olefin derived units. Alternatively, instead of isotactic polypropylene, a first component of the present invention may include a syndiotactic polypropylene, which in certain cases can have a melting point above 110° C. Yet another alternative thermoplastic can include an atactic polypropylene. The polypropylene can either be derived exclusively from propylene monomers (i.e., having only propylene units) or be derived from mainly propylene (more than 80% propylene). Certain polypropylenes having a high MFR (230/2.16) (e.g., from a low of 10, or 15, or 20 dg/min to a high of 25 or 30 dg/min) may be used as the thermoplastic. Others having a lower MFR, e.g., "fractional" polypropylenes which have an MFR less than 1.0 dg/min may also be used.

The thermoplastic may be present in the DVA in an amount within the range of from 5 or 10 or 15 or 20 or 30 to 40 or 50 or 60 or 70 wt %, by weight of the DVA. The curable polymer may be present in the DVA in an amount within the range of from 5 or 10 or 15 or 20 or 30 to 40 or 50 or 60 or 70 wt %, by weight of the DVA.

The "additive" can include any material that may be included as a part of the DVA, beyond the minimum of having at least one thermoplastic and at least one curable polymer. For example, any process oil, curing agent, or filler is regarded as an "additive" for purposes of this disclosure. Also, other polymers such as LDPE, HDPE, LLDPE, propylene copolymers, plastomers (ethylene-based copolymers), styrenic copolymers, fluoropolymers, and other polymers can be added to the extruder as an additive. A non-exclusive list of additives broadly includes carbon black and other particulate fillers, silica, titanium dioxide, colored pigments, clay, zinc oxide, stearic acid, stabilizers, anti-degradants, flame retardants, processing aids, adhesives, tackifiers, plasticizers, wax, discontinuous fibers (such as cellulose fibers). Particularly when non-black fillers are used, it is desirable to include a coupling agent to compatibilize the interface between the non-black fillers and the polymers. The filler, when present in one or more contact layers, is present within the range of from 5 or 10 to 30 or 40 or 50 wt %, by weight of the DVA, in one embodiment. The process oil, when present, is present within the range of from 5 or 10 to 30 or 40 or 50 wt %, by weight of the DVA, in one embodiment.

Useful commercial DVAs include Vyram™ and Santoprene™ grades (ExxonMobil Chemical Co.) Other useful DVAs and/or thermoplastic vulcanizates (TPVs) include certain grades of Sarlink™ from DSM Elastomers (The Netherlands), and NexPrene™ from Solvay Engineered Polymers (Mansfield, Tex.).

The "propylene-α-olefin copolymers" described herein are copolymers of propylene-derived units and one or more units derived from ethylene or a $C_4$-$C_{10}$ α-olefin and optionally one or more diene-derived units. Preferred α-olefins are ethylene, 1-butene, 1-hexene and 1-octene. Typical comonomer content of the copolymer is from 5 to 35 wt % in one embodiment. In general, the comonomer content is adjusted so that the copolymer preferably has a MWD (Mw/Mn) of from 1.5 to 20, more preferably from 1.5 to 5, a heat of fusion ($H_f$) less than or equal to 75 J/g and a peak melting temperature ($T_m$) less than or equal to 110° C. In some embodiments, where more than one comonomer is present, the amount of a particular comonomer may be less than 5 wt %, but the combined comonomer content is preferably greater than 5 wt %.

In such an embodiment, when there is more than one α-olefin-derived unit in the copolymer, the total weight percent of the ethylene or $C_4$-$C_{10}$ α-olefin-derived units (or "α-olefin") is preferably from 5 to 35 wt %, more preferably from 7 to 32 wt %, more preferably from 8 to 25 wt %, more preferably from 8 to 20 wt %, and more preferably from 8 to 18 wt %. Particular embodiments of copolymers having more than one α-olefin include propylene-ethylene-octene, propylene-ethylene-hexene and propylene-ethylene-butene polymers. These copolymers may further comprise a diene as described below.

In a particular embodiment, the propylene-α-olefin copolymer comprises propylene-derived units and comonomer units selected from ethylene, 1-hexene and 1-octene. The copolymer comprises from 5 to 25 wt % monomer-derived units in one embodiment, and from 5 to 20 wt % in another embodiment, and from 5 to 16 wt % in yet another embodiment, and from 6 to 18 wt % in yet another embodiment, and from 8 to 20 wt % in yet another embodiment. In a more particular embodiment, the comonomer is ethylene.

The propylene-α-olefin copolymer, a propylene-ethylene copolymer in one embodiment, may optionally comprise less than or equal to 10 wt % diene derived units (or "diene"), preferably less than or equal to 5 wt % diene, more preferably less than or equal to 3 wt % diene, preferably from 0.1 to 3 or 4 or 5 or 6 wt %, more preferably from 0.1 to 2 wt %, and more preferably from 0.1 to 1 wt % diene. Suitable dienes useful as co-monomers are, for example: 1,4-hexadiene, 1,6-octadiene, 5-methyl-1,4-hexadiene, 3,7-dimethyl-1,6-octadiene, dicyclopentadiene (DCPD), ethylidiene norbornene (ENB), norbornadiene, 5-vinyl-2-norbornene (VNB), and combinations thereof. The diene, if present, is most preferably ENB.

The propylene-α-olefin copolymer can have a triad tacticity of three propylene units, as measured by $^{13}C$ NMR, of 75% or greater, 80% or greater, 82% or greater, 85% or greater, or 90% or greater. Preferred ranges include from 50 to 99%, more preferably from 60 to 99%, more preferably from 75 to 99% and more preferably from 80 to 99%; and in other embodiments from 60 to 97%. Triad tacticity was determined as follows: The tacticity index, expressed herein as "m/r", is determined by $^{13}C$ nuclear magnetic resonance (NMR). The tacticity index m/r is calculated as defined by H. N. Cheng in 17 MACROMOLECULES 1950 (1984). The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios of greater than 50. Embodiments of the propylene-α-olefin copolymer have a tacticity index m/r ranging from a lower limit of 4 or 6 to an upper limit of 8 or 10 or 12.

In certain embodiments the propylene-α-olefin copolymer has a heat of fusion ($H_f$), determined according to the Differential Scanning Calorimetry (DSC) procedure described herein, greater than or equal to 0.5 or 1 or 5 J/g, and is less than or equal to 75 J/g, preferably less than or equal to 70 J/g, more preferably less than or equal to 50 J/g, more preferably less than or equal to 35 J/g. Stated another way, in one or more embodiments the $H_f$ value is within the range of from 1.0, or 1.5, or 3.0, or 4.0, or 6.0, or 7.0 J/g to 30, or 35, or 40, or 50, or 60 or 70, or 80 J/g.

In certain embodiments, the propylene-α-olefin copolymer, a propylene-ethylene copolymer in one embodiment, has a percent crystallinity within the range of from 0.5 to 40%, preferably 1 to 30%, and more preferably 5 to 25% wherein "percent crystallinity" is determined according to the DSC procedure described herein. The thermal energy for the highest order of polypropylene is estimated at 189 J/g (i.e., 100% crystallinity is equal to 189 J/g). In another embodiment, the propylene-α-olefin copolymer of the present disclosure has a crystallinity within the range of less than 40%, and from 0.25 to 25% in another embodiment, and from 0.5 to 22% in yet another embodiment, and from 0.5 to 20% in yet another embodiment.

The propylene-α-olefin copolymer may have a single peak melting transition as determined by DSC; in certain embodiments the propylene-α-olefin copolymer has a primary peak melting transition at from less than 90° C., with a broad end-of-melt transition at greater than about 110° C. The peak "melting point" ($T_m$) is defined as the temperature of the greatest heat absorption within the range of melting of the sample. However, the propylene-α-olefin copolymer may show secondary melting peaks adjacent to the principal peak, and or the end-of-melt transition, but for purposes herein, such secondary melting peaks are considered together as a single melting point, with the highest of these peaks being considered the $T_m$ of the propylene-α-olefin copolymer. The propylene-α-olefin copolymer preferably has a $T_m$ value within the range of from less than and a peak melting temperature ($T_m$) less than or equal to 70 or 80 or 90 or 100° C. in one embodiment; and within the range of from 25 to 100° C. in yet another embodiment, and from 25 to 85° C. in yet another embodiment, and from 25 to 75° C. in yet another embodiment, and from 25 to 65° C. in yet another embodiment, and from 30 to 80° C. in yet another embodiment, and from 30 to 70° C. in yet a more particular embodiment.

The procedure for DSC determinations is as follows. About 0.5 grams of polymer was weighed out and pressed to a thickness of about 15-20 mils (about 381-508 microns) at about 140° C.-150° C., using a "DSC mold" and Mylar as a backing sheet. The pressed pad was allowed to cool to ambient temperature by hanging in air (the Mylar was not removed). The pressed pad was annealed at room temperature (about 23-25° C.) for about 8 days. At the end of this period, an about 15-20 mg disc was removed from the pressed pad using a punch die and was placed in a 10 microliter aluminum sample pan. The sample was placed in a differential scanning calorimeter (Perkin Elmer Pyris 1 Thermal Analysis System) and was cooled to about −100° C. The sample was heated at about 10° C./min to attain a final temperature of about 165° C. The thermal output, recorded as the area under the melting peak of the sample, is a measure of the heat of fusion and can be expressed in Joules per gram (J/g) of polymer and was automatically calculated by the Perkin Elmer System. Under these conditions, the melting profile shows two (2) maxima, the maxima at the highest temperature was taken as the melting point within the range of melting of the sample relative to a baseline measurement for the increasing heat capacity of the polymer as a function of temperature.

In certain embodiments, the propylene-α-olefin copolymer can have a density within the range of from 0.850 to 0.920 g/cm$^3$, more preferably, 0.870 to 0.900 g/cm$^3$, more preferably 0.880 to 0.890 g/cm$^3$ at room temperature as measured per the ASTM D-1505 test method.

In certain embodiments, the propylene-α-olefin copolymer can have a melt flow rate (MFR, ASTM D1238, 2.16 kg, 230° C.), equal to or greater than 0.2 dg/min. Preferably, the MFR is from 0.5 to 5000 dg/min and more preferably from 1 to 2500 dg/min. In one embodiment, the propylene-α-olefin copolymer has an MFR within the range of from 0.5 to 1500 dg/min, from 2 to 1000 dg/min in another embodiment, and from 5 to 500 dg/min in yet another embodiment, and from 10 to 250 dg/min in yet another embodiment, and from 10 to 100 dg/min in yet another embodiment, and from 2 to 40 dg/min in yet another embodiment, and from 2 to 30 dg/min in yet another embodiment, and from 0.5 to 10 dg/min in yet another embodiment.

In certain embodiments, the propylene-α-olefin copolymers, propylene-ethylene copolymers in one embodiment, may have a Mooney viscosity value [ML (1+4) (125° C.] as determined according to ASTM D1646, of less than 100, more preferably less than 75, even more preferably less than 60, most preferably less than 30. In yet another embodiment, the propylene-α-olefin copolymers possess an Elongation at Break (ASTM D 412) of less than 2000%, and less than 1000% in another embodiment, and less than 800% in yet another embodiment.

In one embodiment, the propylene-α-olefin copolymer has a Mw value within the range of from 5,000 to 5,000,000 g/mole, more preferably a Mw of 10,000 to 1,000,000, and more preferably a Mw of 50,000 to 400,000. In another embodiment, the propylene-α-olefin copolymer has a Mn value within the range of from 2,500 to 2,500,000 g/mole, more preferably a Mn of 10,000 to 250,000, and more preferably a Mn of 25,000 to 200,000. In yet another embodiment, the propylene-α-olefin copolymer can have a Mz value within the range of from 10,000 to 7,000,000 g/mole, more preferably a Mz of 80,000 to 700,000, and more preferably a Mz of 100,000 to 500,000.

The molecular weight distribution (MWD) of the propylene-α-olefin copolymer is within the range of from 1.5 to 20 in one embodiment, and from 1.5 to 15 in another embodiment, and more preferably 1.5 to 5, more preferably 1.8 to 5 and most preferably 1.8 to 3 or 4.

Techniques for determining the molecular weight (Mn, Mz and Mw) and molecular weight distribution (MWD) are as follows, and as in Verstate et al. in 21 MACROMOLECULES 3360 (1988). Conditions described herein govern over published test conditions. Molecular weight and molecular weight distribution are measured using a Waters 150 gel permeation chromatograph equipped with a Chromatix KMX-6 on-line light scattering photometer. The system was used at 135° C. with 1,2,4-trichlorobenzene as the mobile phase. Showdex (Showa-Denko America, Inc.) polystyrene gel columns 802, 803, 804 and 805 are used. This technique is discussed in LIQUID CHROMATOGRAPHY OF POLYMERS AND RELATED MATERIALS III 207 (J. Cazes ed., Marcel Dekker, 1981). No corrections for column spreading were employed; however, data on generally accepted standards, e.g., National Bureau of Standards Polyethylene 1484 and anionically produced hydrogenated polyisoprenes (an alternating ethylenepropylene copolymer) demonstrate that such corrections on Mw/Mn or Mz/Mw are less than 0.05 units. Mw/Mn was calculated from an elution time-molecular weight relationship whereas Mz/Mw was evaluated using the light scattering photometer. The numerical analyses can be performed using the commercially available computer software GPC2, MOLWT2 available from LDC/Milton Roy-Riviera Beach, Fla.

The propylene-α-olefin copolymers can include copolymers prepared according to the procedures in WO 02/36651, U.S. Pat. No. 6,992,158, and/or WO 00/01745. Preferred methods for producing the propylene-α-olefin copolymers are found in US Patent Application Publication 2004/0236042 and U.S. Pat. No. 6,881,800. Useful propylene-α-olefin copolymers are available commercially under the trade names Vistamaxx™ (ExxonMobil Chemical Company, Houston, Tex., USA) and Versify™ (The Dow Chemical Company, Midland, Mich., USA), certain grades of Tafmner™ XM or Notio™ (Mitsui Company, Japan) or certain grades of Softel™ (Basell Polyolefins of the Netherlands).

The one or more "substrate layer(s)" of the anti-skid sheet are preferably rigid and impact resistant. In one aspect of the invention, the substrate layer comprises at least 70 wt %, or at least 80 wt %, or at least 90 wt %, or at least 100 wt % high density polyethylene by weight of the substrate layer composition. As used herein, "high density polyethylene" is a polyethylene homopolymer or copolymer possessing a density of greater than 0.930 g/cm$^3$, and greater than 0.940 g/cm$^3$ in another embodiment, and greater than 0.945 g/cm$^3$ in yet another embodiment, and at least 0.950 g/cm$^3$ in yet another embodiment. The high density polyethylene can derive from any known process such as gas phase polymerization or slurry polymerization. The one or more substrate layers may also comprise edge-trim high density polyethylene, and other sources of excess and/or waste polyethylene.

Examples of useful commercial high density polyethylenes include the Paxon™ series of HDPEs (ExxonMobil Chemical Co.), and the HD6000 series (ExxonMobil Chemical Co.). Preferably, the high density polyethylene has a high load melt index (190° C./21.6) within the range of from 0.5 to 40 dg/min in one embodiment, and from 1 to 20 dg/min in another embodiment, and from 2 to 10 dg/min in yet another embodiment. Also, the high density polyethylene has a Flexural Modulus (1% Secant, ASTM D-790 (B)) within the range of from 400 to 2000 MPa, and from 500 to 1500 MPa in another embodiment. In yet another embodiment, useful high density polyethylenes possess a Notched Izod Impact (−40° C., ASTM D-256) within the range of from 40 to 400 J/m, and from 50 to 350 J/m in another embodiment, and from 120 to 300 J/m in yet another embodiment.

To improve its performance, the substrate layer(s) may comprise from 0.1 to 10 wt % of a mineral filler, and from 5 to 20 wt % in another embodiment, and from 8 to 30 wt % in yet another embodiment. Non-limiting examples of suitable mineral fillers include talc, silica, fumed silica, alumina, silica-alumina, calcium carbonate, carbon black, clays, titanium dioxide, and mixtures thereof.

To improve its performance, the substrate layer(s) may also comprise from 0.1 to 10 wt % of a polypropylene, and from 5 to 20 wt % in another embodiment, and from 8 to 30 wt % in yet another embodiment. The term "polypropylene" here includes homopolymers, random copolymers, block copolymers and impact copolymers. The random copolymers may comprise from 0.1 to 10 wt % of ethylene or a $C_4$ to $C_{10}$ α-olefin. The impact copolymers typically comprise a blend of a propylene homopolymer and an ethylene-propylene rubber, the rubber making up from 10 to 60 wt % of the impact copolymer in one embodiment.

The materials used to make the one or more substrate layers and the one or more contact layers can be co-extruded to form a sheet having two, three, four or more layers. In general, the process includes first melting each material in an appropriate device and depositing or extruding these molten or semi-molten materials together through a die or dies. The various layers can be combined in the melt stage via appropriate mechanisms known in the art prior to exiting the die, or combined after exiting the die. This is followed by contacting the thus formed multi-layered anti-skid sheet with a series of chill rolls and sheet conveyer. The cooled anti-skid sheet is then cut to size or rolled by appropriate means.

In one embodiment, the temperature controllers of the extruder(s) used to process the layers are set at 180 to 290° C. in one embodiment, and from 190 to 280° C. in another embodiment. In one embodiment, one or more extruders are used, each comprising at least one die, that allows for thermal isolation and/or control of each of the materials being melted to form the multi-layer anti-skid sheet. The temperature control can be achieved by any suitable means as by insulation and/or thermal cooling and/or heating elements that can be controlled by electricity, steam, oil, or other gases or liquids. Such a co-extrusion apparatus is described in, for example, U.S. Pat. Nos. 5,516,474 and 5,120,484, and references cited therein. The extruder/die may have separate extrusion layers within the die, and having a means be which to heat the material to a temperature higher than the melt temperature going into the die. For example, the die temperature may generally be at from 180 to 290° C., while one or more of the material streams that will make up the sheet may be further heated to from 230 to 270° C. Heating the layer having the pigment in this manner is particularly desirable.

Further, the cooling of the anti-skid sheet takes place on a chill roll or rolls, and may be cooled any number of ways. In one embodiment, the cooling takes place at a chill roll temperature of from 25 to 75° C. In yet another embodiment, the chill rolls are at from 4 to 20° C., and within the range of from 50 to 130° C. in yet another embodiment. In the later embodiment, a dull finish is achieved when using a metallic pigment when the anti-skid sheet is heated in the subsequent thermoforming process.

The anti-skid sheet can be of any desirable thickness, as can each of the layers, independently. In one embodiment, each substrate layer independently has a thickness within the range of from 0.15 to 10 mm, and from 0.20 to 8 mm in another embodiment, and from 1 to 7 mm in yet another embodiment, wherein each layer's thickness can be individually chosen. In another embodiment, each contact layer independently has a thickness within the range of from 25 to 2000 μm, and from 30 to 1500 μm in another embodiment, and from 50 to 1000 μm in yet another embodiment.

The anti-skid sheets may be shaped into the profile of a desirable end use article by any suitable means known in the art. Thermoforming, vacuum forming, and blow molding are desirable embodiments of such an anti-skid sheet shaping means. Various means for forming are outlined in CONCISE ENCYCLOPEDIA OF POLYMER SCIENCE AND ENGINEERING 90-92 (Jacqueline I. Kroschwitz, ed., John Wiley & Sons 1990). In one embodiment, the sheets are formed into articles using the process of thermoforming.

Thermoforming is a process of forming at least one pliable plastic sheet into a desired shape. In an embodiment of the present invention, the anti-skid sheet that is formed from one or more substrate layer(s) and contact layer(s) are thermoformed into a desirable shape, typically the shape of the end use article. An embodiment of the thermoforming sequence is described. First, the co-extruded anti-skid sheet is placed on a shuttle rack to hold it during heating. The shuttle rack indexes into the oven which pre-heats the sheet before forming. Once the sheet is heated, the shuttle rack indexes back to the forming tool. The sheet is then vacuumed onto the forming tool to hold it in place and the forming tool is closed. The forming tool can be either "male" or "female" type tools. The tool stays closed to cool the sheet and the tool is then opened. The shaped anti-skid sheet is then removed from the tool.

Thermoforming is accomplished by vacuum, positive air pressure, plug-assisted vacuum forming, or combinations and variations of these, once the sheet of material reaches thermoforming temperatures of from 140 to 185° C. or higher. A pre-stretched bubble step is used, especially on large parts, to improve material distribution. In one embodiment, an articulating rack lifts the heated anti-skid sheet towards a male forming tool, assisted by the application of a vacuum from orifices in the male forming tool. Once the anti-skid sheet is firmly formed about the male forming tool, the thermoformed shaped anti-skid sheet is then cooled, typically by blowers. Plug-assisted forming is generally used for small, deep drawn parts. Plug material, design, and timing can be critical to optimization of the process. Plugs made from insulating foam avoid premature quenching of the plastic. The plug shape is usually similar to the mold cavity, but smaller and without part detail. A round plug bottom will usually promote even material distribution and uniform side-wall thickness. For a semicrystalline polymer such as polypropylene, fast plug speeds generally provide the best material distribution in the part.

The shaped anti-skid sheet is then cooled in the mold. Sufficient cooling to maintain a mold temperature of 30 to 65° C. is desirable. The part is below 90 to 100° C. before ejection in one embodiment. For the best behavior in thermoforming, the lowest melt flow rate polymers are desirable. The shaped anti-skid sheet is then trimmed of excess anti-skid sheet material before any further processing.

In yet another embodiment of the invention, the anti-skid sheet may be secured to a substrate material using a blow molding operation. Blow molding is particularly useful in such applications as for making closed articles such as fuel tanks and other fluid containers, playground equipment, outdoor furniture and small enclosed structures. In one embodiment of this process, two or more substrate and contact layers are co-extruded as described above. The co-extrusion takes place through a multi-layer head, followed by placement of the uncooled anti-skid sheet into a parison in a mold. The mold, with either male or female patterns inside, is then closed and air is blown into the mold to form the part. In one embodiment, the shaped anti-skid sheet inside the mold can then be subjected to injection of substrate and/or contact layer materials if so desired to form the finished article.

In any case, the sheet can be formed into an article wherein each layer is co-continuous, meaning that the layer materials in each layer are contacting one another throughout the article formed from the anti-skid sheet. In another embodiment, the layers are not co-continuous, but may form cells there between. For example, in one embodiment a four layer sheet is constructed having two contact layers and two substrate layers in between, wherein in one or more sections of the sheet the substrate layers do not touch, but form an open "cell" or hollow portion. The sheet can possess any number of cells, and the cells can be formed by any conventional technique known in the art. Such cells in certain embodiments are large enough that they impart an exterior structural element to the sheet, such as a ridge or a shaped riser from the plane of the sheet, the riser acting as, in one example, a foot for a pallet.

The properties of the formed article can be tailored by adjusting the layer structure and/or the composition forming each layer. In a particular embodiment of the anti-skid sheets described herein, the dynamically vulcanized alloy comprises a blend of one or more polyolefins and an at least partially vulcanized rubber. In one embodiment, the polyolefin(s) are selected from polypropylenes; and even more particularly, the polypropylenes comprise a first polypropylene homopolymer having a melt flow rate (230/2.16) within the range of from 0.05 to 2 dg/min, and a second polypropylene homopolymer having a melt flow rate (230/2.16) within the range of from 4 to 30 dg/min.

The softness (or hardness) of the contact layer can be controlled by any means such as by blending softer materials therein such as plastomers, etc, and by adjusting the rubber level in the DVA. In one embodiment, the one or more rubbers comprise from 45 to 80 wt % of the dynamically vulcanized alloy, by weight of the dynamically vulcanized alloy. In yet a more particular embodiment, the one or more rubbers comprise from 50 to 65 wt % of the dynamically vulcanized alloy, by weight of the dynamically vulcanized alloy. And in yet a more particular embodiment, the one or more rubbers are selected from EPDM rubbers.

Each of the one or more propylene-α-olefin copolymer(s) and high density polyethylene(s) making up the contact layer (s) can be described by numerous preferred properties as disclosed herein. For example, in one embodiment, the propylene-α-olefin copolymer, when present, possesses a heat of fusion ($H_f$) less than or equal to 75 J/g and a peak melting temperature ($T_m$) less than or equal to 110° C. In yet another embodiment, the high density polyethylenes possess a Notched Izod Impact (−40° C., ASTM D-256) within the range of from 40 to 400 J/m.

In a more particular embodiment, the one or more contact layers comprise one or more dynamically vulcanized alloys. And in yet a more particular embodiment, the sheet consists essentially of one contact layer and one substrate layer.

In another embodiment, the anti-skid sheet comprises at least two contact layers; and at least one substrate layer. In yet a more particular embodiment, the anti-skid sheet comprises at least two contact layers; and at least two substrate layers; wherein the at least two polyethylene layers form at least one open cell there between. And in yet a more particular embodiment, the anti-skid sheet consists essentially of two contact layers; and two substrate layers; wherein the two substrate layers form at least one open cell there between.

In a particular embodiment, the sheet as described in its numerous embodiments is formed by a method comprising providing a melt-blending extruder for each of the sheet layers and co-extruding a melt of each component to form a co-extruded sheet. In yet another embodiment, the sheet is further process by thermoforming the co-extruded sheet to form an article. The article in a desirable embodiment is a pallet, examples of which are disclosed in U.S. Pat. No. 4,428,306 and US Publication 2003/0041956 A1.

Having descried the various aspects of the present invention, described herein in several numbered embodiments is:

1. An anti-skid sheet comprising (a) at least one contact layer selected from the group consisting of dynamically vulcanized alloys, propylene-α-olefin copolymers, and blends thereof, and (b) at least one substrate layer comprising polyethylene having a density of from greater than 0.935 g/cm$^3$.
2. The anti-skid sheet of numbered embodiment 1, wherein the dynamically vulcanized alloy comprises a blend of one or more polyolefins and an at least partially vulcanized rubber.
3. The anti-skid sheet of numbered embodiments 1 and 2, wherein the polyolefin(s) are selected from polypropylenes.
4. The anti-skid sheet of any of the preceding embodiments, wherein the polypropylenes comprise a first polypropylene homopolymer having a melt flow rate (230/2.16) within the range of from 0.05 to 2 dg/min, and a second polypropylene homopolymer having a melt flow rate (230/2.16) within the range of from 4 to 30 dg/min.
5. The anti-skid sheet of any of the preceding embodiments, wherein the propylene-α-olefin copolymer has a heat of fusion ($H_f$) less than or equal to 75 J/g and a peak melting temperature ($T_m$) less than or equal to 110° C.
6. The anti-skid sheet of any of the preceding embodiments, wherein the one or more contact layers comprise one or more dynamically vulcanized alloys.
7. The anti-skid sheet of any of the preceding embodiments, wherein the sheet consists essentially of one contact layer and one substrate layer.
8. The anti-skid sheet of any of the preceding embodiments, wherein the anti-skid sheet comprises at least two contact layers; and at least one substrate layer.
9. The anti-skid sheet of any of the preceding embodiments, wherein the anti-skid sheet comprises at least two contact layers; and at least two substrate layers; wherein the at least two polyethylene layers form at least one open cell there between.
10. The anti-skid sheet of any of the preceding embodiments, wherein the anti-skid sheet consists essentially of two contact layers; and two substrate layers; wherein the two substrate layers form at least one open cell there between.
11. The anti-skid sheet of any of the preceding embodiments, wherein the one or more polyethylenes possess a density of greater than 0.940 g/cm$^3$.
12. The anti-skid sheet of claim 2, wherein the one or more rubbers comprise from 45 to 80 wt % of the dynamically vulcanized alloy, by weight of the dynamically vulcanized alloy.
13. The anti-skid sheet of embodiment 2, wherein the one or more rubbers comprise from 50 to 65 wt % of the dynamically vulcanized alloy, by weight of the dynamically vulcanized alloy.
14. The anti-skid sheet of embodiment 2, wherein the one or more rubbers are selected from EPDM rubbers.
15. The anti-skid sheet of any of the preceding embodiments, wherein the one or more substrate layers have a thickness within the range of from 0.15 mm to 10 mm.
16. The anti-skid sheet of any of the preceding embodiments, wherein the one or more contact layers have a thickness within the range of from 25 to 2000 μm.
17. A pallet comprising the anti-skid sheet of any of the preceding embodiments.
18. A method of forming the anti-skid sheet of any of the preceding embodiments comprising providing a melt-blending extruder for each of the sheet layers and co-extruding a melt of each component to form a co-extruded sheet.
19. The method of any of the preceding embodiments, further comprising thermoforming the co-extruded sheet to form an article.

What is claimed is:

1. An anti-skid sheet comprising:

(a) first and second contact layers consisting of dynamically vulcanized alloys, said alloys comprising a cured polymer and from 70 to 45 wt % of a combination of a first polypropylene homopolymer having a melt flow rate (230/2.16) from 0.05 to 2 dg/min and a second polypropylene homopolymer having a melt flow rate (230/2.16) from 4 to 30 dg/min, wherein the combination has a melting temperature greater than 110° C.; and (b) at least two substrate layers comprising polyethylene having a density of from greater than 0.935 g/cm$^3$, wherein the two substrate layers form at least one open cell there between.

2. A pallet comprising the anti-skid sheet of claim 1.

3. An anti-skid sheet comprising:

(a) first and second contact layers consisting of a blend of:

(i) dynamically vulcanized alloys comprising a cured polymer and from 70 to 45 wt % of a combination of a first polypropylene homopolymer having a melt flow rate (230/2.16) from 0.05 to 2 dg/min and a second polypropylene homopolymer having a melt flow rate (230/2.16) from 4 to 30 dg/min, wherein the combination has a melting temperature greater than 110° C., and (ii) propylene-α-olefin copolymers having 5 to 35 wt % of units derived from one or more $C_4$-$C_{10}$ α-olefin comonomers and peak melting temperatures (Tm) less than or equal to 110° C.; and (b) at least two substrate layers comprising polyethylene having a density of from greater than 0.935 g/cm$^3$, wherein the two substrate layers form at least one open cell there between

4. The anti-skid sheet of claim 3, wherein the anti-skid sheet consists of the first and second contact layers; and two substrate layers; wherein the two substrate layers form at least one open cell there between.

5. The anti-skid sheet of claim 3, wherein the dynamically vulcanized alloys comprise from 50 to 65 wt % of the one or more rubbers, by weight of the dynamically vulcanized alloy.

6. The anti-skid sheet of claim 5, wherein the one or more rubbers are selected from EPDM rubbers.

7. The anti-skid sheet of claim 3, wherein the two or more substrate layers have a thickness within the range of from 0.15 mm to 10 mm.

8. The anti-skid sheet of claim 3, wherein the two contact layers have a thickness within the range of from 25 to 2000 μm.

9. A method of forming the anti-skid sheet of claim 3, comprising providing a melt-blending extruder for each of the sheet layers and co-extruding a melt of each component to form a co-extruded sheet.

10. The method of claim 9, further comprising thermoforming the co-extruded sheet to form an article.

* * * * *